United States Patent [19]

Staib

[11] 3,817,222

[45] June 18, 1974

[54] ATMOSPHERIC POLLUTION CONTROL SYSTEM FOR AN INTERNAL COMBUSTION ENGINE

[75] Inventor: Estel G. Staib, Tulsa, Okla.

[73] Assignee: Head & Johnson, P.A., Tulsa, Okla.; a part interest

[22] Filed: Nov. 20, 1972

[21] Appl. No.: 307,878

[52] U.S. Cl.............. 123/25 F, 60/278, 60/310, 123/41.55, 123/119 A, 123/119 B
[51] Int. Cl. ... F02m 25/04, F02m 25/06, F01n 3/04
[58] Field of Search........ 60/93, 94, 310, 317, 320, 60/309, 278; 123/119 A, 25.3 E, 25.31 F, 25.11, 25.7, 41.55, 119 B, 41.3, 41.44, 41.45

[56] References Cited
UNITED STATES PATENTS

| | | | |
|---|---|---|---|
| 1,714,318 | 5/1929 | Parr et al.......................... | 123/41.45 |
| 1,728,973 | 9/1929 | Lonergan............................ | 60/309 |
| 2,087,411 | 7/1937 | Lundquist........................... | 60/309 |
| 3,352,353 | 11/1967 | Stevens et al..................... | 60/309 X |
| 3,363,613 | 1/1968 | Price.................................. | 123/119 B |
| 3,641,769 | 2/1972 | Vizza.................................. | 60/310 |
| 3,664,135 | 5/1972 | Lirette............................... | 60/310 |

*Primary Examiner*—Al Lawrence Smith
*Assistant Examiner*—Tony Argenbright
*Attorney, Agent, or Firm*—Head & Johnson

[57] ABSTRACT

This invention comprises a combustion muffler and radiator, or heat exchanger, for an internal combustion engine. Engine exhaust emissions are joined with cooling liquids which flow through the engine block by means of a "Y" shaped fitting which directs the mixture of exhaust gases and cooling liquids through a mixing tube to splash against a diverter plate within the muffler on top of the radiator. The radiator and muffler are in one housing. The diverter plate directs the flow of liquid downward. The exhaust gases, which have been intimately mixed with the liquid, flow upward through a series of perforated baffles. They vent through pipes attached to the dome at the top of the container, into the atmosphere. The cooling liquids which may be a combination of water and glycol base antifreeze, for example, washes all solids and soluble gases out of the exhaust gases, so that the effluent gases are free of any pollution before they vent into the atmosphere.

4 Claims, 7 Drawing Figures

3,817,222

ATMOSPHERIC POLLUTION CONTROL SYSTEM FOR AN INTERNAL COMBUSTION ENGINE

BACKGROUND OF THE INVENTION

This invention is in the field of antipollution devices. More particularly, it is concerned with the washing of solid and gaseous impurities from the exhaust gases from an internal combustion engine, so that the effluent gases are free of pollution before they vent into the atmosphere.

In recent years there has been an increasing interest in the reduction of pollution of the air, particularly as regards the flow of noxious impurities in the exhaust gases of motor vehicles. This invention is directed to the removal of such impurities from the exhaust gases by means which are readily available at the vehicle.

In the prior art there are examples of devices, such as those which use the cooling water that flows through the engine and radiator to condense the water vapor in the effluent exhaust gases. Other means are shown in the prior art also for using auxiliary heat transfer devices to cool the exhaust gases, and so on. To the inventor's knowledge there is no example in the prior art of a device which provides all of the steps which are performed by this invention.

SUMMARY OF THE INVENTION

It is a primary object of this invention to provide a means by which the exhaust gases from an internal combustion engine on a vehicle can be washed, the water vapor condensed and all impurities removed from the effluent gases before they are discharged into the atmosphere.

This and other objects are realized and the limitations of the prior art are overcome in this invention by mixing in a "Y" shaped conduit, the exhaust gases from the engine and the cooling water return line from the engine to the radiator. This mixture of exhaust gases and liquid are directed to a splash plate or diverter, whereby there is intimate mixing of the gases and the water, so that the gases may be washed of all pollutants, gaseous and solid, before the exhaust gases are permitted to rise up through a series of baffles and be collected in the top of the radiator housing. The exhaust gases then pass through pipes to the atmosphere, free of all pollution.

In addition, all outlets from the engine crankcase are sealed, and vapors from this space are carried to the carburetor inlet to be burned with engine fuel.

BRIEF DESCRIPTION OF THE DRAWINGS

These and other objects are realized and the limitations of the prior art are overcome in this invention and a better understanding of the principles and details of the invention will be evident from the following description taken in conjunction with the appended drawings, in which.

DESCRIPTION OF THE PREFERRED EMBODIMENT

Figure 1:
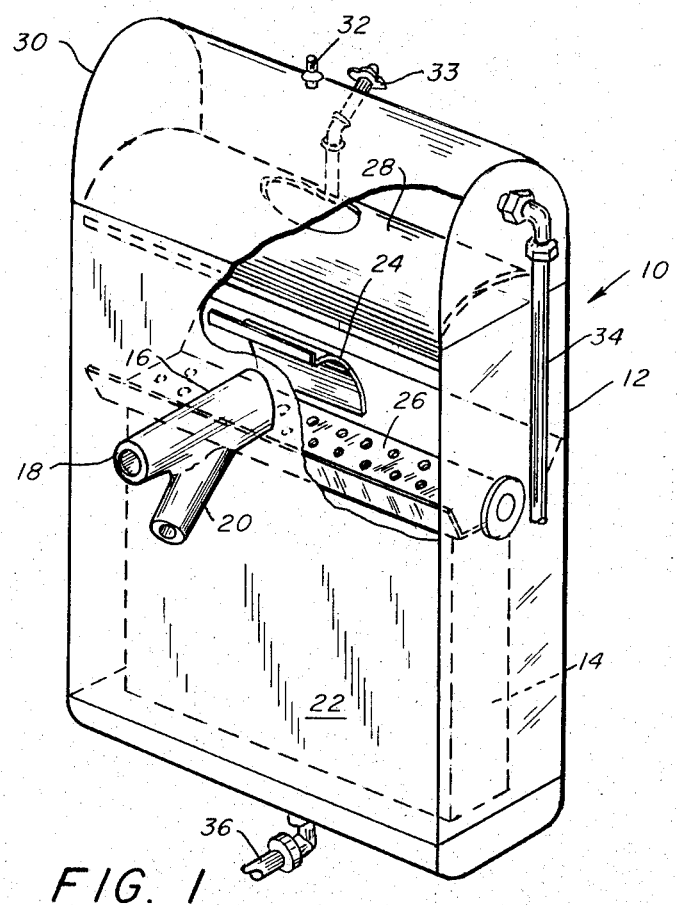
FIG. 1 represents in partial section a view of the radiator as modified to provide the action of this invention.

Referring now to the drawings, and in particular to FIG. 1, there is shown a view, partially in section, of the principal embodiment 10 of this invention. It comprises a housing 12, in the lower part of which is inserted the heat transfer apparatus of the conventional automobile radiator. This conventional radiator has a housing which extends upwardly to form a dome 30 in which additional processes are carried out. On one side 22 of the housing 12, above the level of the radiator 14 is a mixing pipe 16, which has two inlets 18, 20, joined in the shape of a "Y". One inlet 18 is for the introduction of exhaust gases from the engine manifold, the other inlet 20 is for the cooling water from the engine block to the radiator.

In the pipe 16 the cooling liquid and the products of combustion from the manifold are mixed, and the mixture is directed against a splash panel or diverter 24 so that there will be intimate mixing of the liquid and the gas. By this means the liquid washes the gas so as to completely remove all soluble vapors and solid particles. It may be desirable to introduce into the cooling liquid chemical means such as glycol solution, etc. which will more readily absorb the gaseous pollutants which are normally found in the exhaust gases. However, the mixing in the zone above the radiator, that is, the dome 10 of the chamber, is sufficient to thoroughly wash the gases. The liquid collects on a plate 26 and passes down through conventional radiator tubes which are in contact with outside cooling air, for the purpose of heat exchange. The liquid is cooled and collects in the bottom of the radiator from which it returns to the engine block through the pipe 36 at the bottom of the radiator.

In the dome 30 the gases having been cleaned by mixing with the liquid, pass upwardly past one or a group of baffles such as 28 which may be perforated and staggered, to prevent the passage of liquid droplets upwardly. All of the gas moves up through the baffles and collects in the upper portion of the dome. From here it is exhausted to the atmosphere by the pipes 34 connected to both sides of the dome. A fitting 32 is available for drawing water vapor from the dome space to the carburetor by conduit 50 shown in FIGS. 2 and 3 for greater efficiency in fuel usage. Pipe means 33 are provided for filling the radiator with fresh cooling water as necessary.

SUMMARY

The invention is adapted to receive the exhaust gases from the engine manifold, and the cooling water from the engine block, to mix the liquid and gases, direct the stream against appropriate baffles inside of the radiator dome, so as to provide intimate mixing and washing of the gases, to remove all of the gaseous and solid pollutants, to permit the liquid to pass down through the radiator conduits and be cooled before being directed back to the engine block through conduit 36. Note: A filter is optional in conduit 36. The exhaust gases pass upwardly and by means of baffles are separated from any liquid droplets so that they pass out through pipes 34 at the sides of the dome and are vented into the atmosphere without any pollution. Thus, from the exhaust gases, the water vapor is condensed and the pollutants are removed before the products of combustion are vented into the atmosphere.

Figure 2:
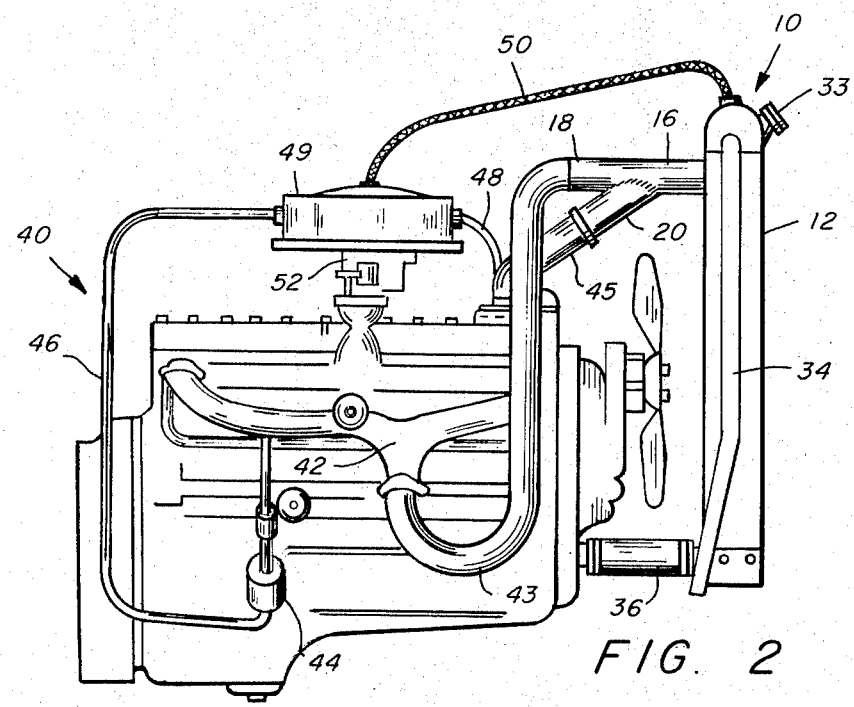
FIGS. 2 and 3 show opposite sides of the engine in order to delineate the conduits for exhaust gases, water, etc.
Figure 3:
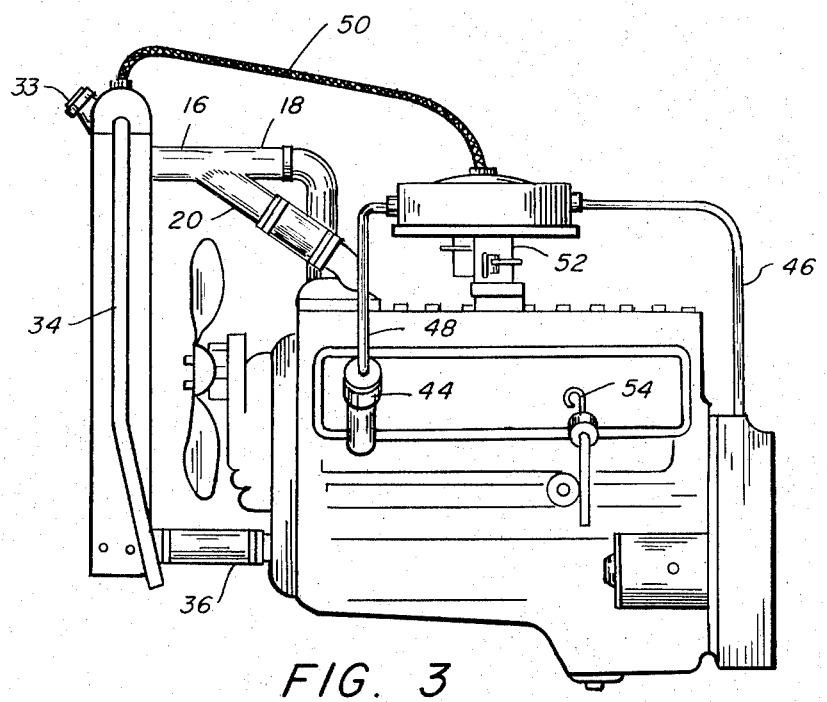

FIGS. 2 and 3 show two views of the engine and radiator system from two sides. In FIG. 2 the engine manifold 42 is connected by conduit 43 to the inlet pipe 18, and the engine cooling water outlet pipe 45 is connected to the inlet 20 of the pipe 16, to flow into the radiator chamber 10.

Figure 4A:
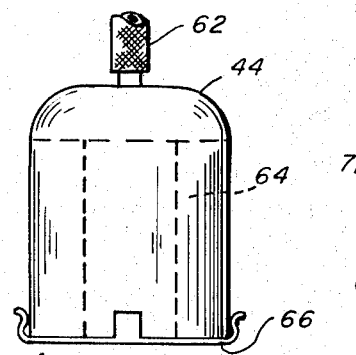
FIGS. 4A, 4B, 5A and 5B show additional features of the invention related to the sealing of all apertures to the engine crankcase.
Figure 4B:
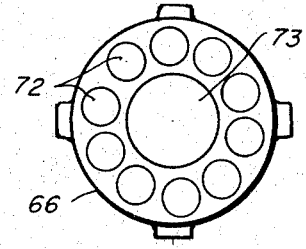
Figure 5B:
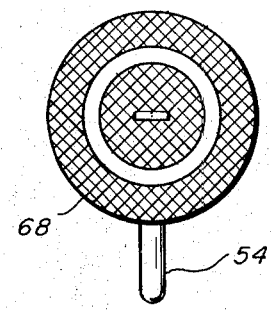
Figure 5A:
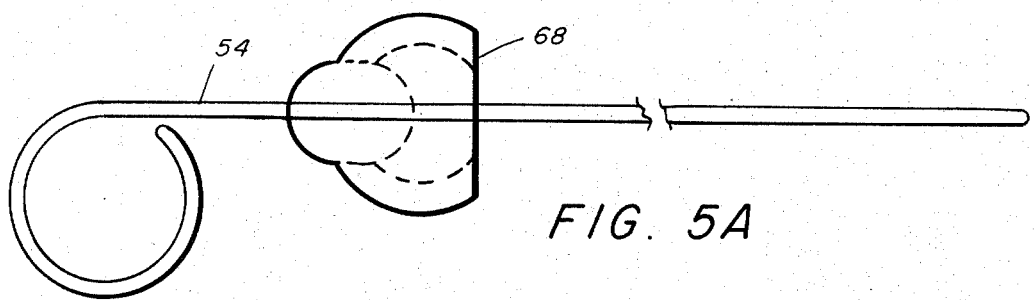

Another feature of the invention is the use of filter means such as shown in FIGS. 4A and 4B over the oil filling pipe and the crankcase ventilation pipe. These comprise containers 44 with a filter means 64 inside. They are closed on the bottom with a plate 66 shown in FIG. 4B. These have perforations 72 in an annular portion of the plate 66 to permit air to be drawn in through the filter 64 into the crankcase through the central passage 73. The outlets 62 are connected by conduits 46 and 48 to the intake filter 49 of the carburetor 52. By this means no vapors can be leaked from the crankcase area to the atmosphere and any hydrocarbon vapors which may be in the crankcase are drawn into the carburetor for combustion.

The dip stick 54, which has a small opening into the crankcase area is provided with a flexible rubber closure device 68 which can be effectively sealed over the outlet of the opening in order to prevent the escape of hydrocarbons and polluting gases from this opening.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. In an internal combustion engine having a radiator for cooling the cooling liquid flowing through the engine block, and having an exhaust manifold, the improvement comprising:
    a. a housing having in its lower part a radiator type heat exchanger, and at its upper part a gas collection dome;
    b. means connected to said manifold to carry exhaust gases to a mixing tube, and means from said engine block to carry cooling liquid to said mixing tube, said mixing tube discharging into said housing through the back wall thereof near the top of said radiator;
    c. deflection plate means in said housing above said radiator;
    d. baffle means in said housing above said deflection plate means;
    e. means near the top of said housing to vent said exhaust gases; and
    f. means near the bottom of said radiator for the return of cooling liquid to said engine.

2. The improvement as in claim 1 including means to carry water vapor from said dome to the carburetor of said engine.

3. The improvement as in claim 1 including means to fill and drain said radiator with cooling liquid.

4. The improvement as in claim 1 and including means to close and seal all crankcase openings and including conduit means to the carburetor of said engine from said crankcase.

* * * * *